2,873,274

PREPARATION OF PIPERAZINE

Andrew Campbell, Jr., Wallingford, Pa., assignor to Houdry Process Corporation, Wilmington, Del., a corporation of Delaware No Drawing. Application August 29, 1956
Serial No. 606,797

4 Claims. (Cl. 260—268)

The present invention relates to the synthesis of piperazine by catalytic condensation reactions and is particularly concerned with the production of this compound from ethylene diamine or other ethylene polyamines.

While piperazine is listed as currently available on the market as such or in the form of its hexahydrates and hydro-chlorides, the supply thereof is rather nebulous and has not kept abreast of increasing requirements. New demands for this compound particularly for use on an anthelmintic in veterinary medicine and as a dietary supplement in animal feeds, particularly for poultry and hogs, are not being met by the available sources of supply and have resulted in steadily increasing prices for this product which appear to be out of proportion to the starting raw material cost. Available commercial facilities are operated under conditions which obtain relatively low yields of piperazine or when the overall yields are increased by more severe reaction conditions result in the production of a crude piperazine product accompanied by undesirable co-products and by-products, some of which are toxic or impart an off odor to the preparation and which are difficult and expensive to remove from the desired piperazine product.

The prior art patents and literature have suggested a number of processes for the production of piperazine, starting from alkylene polyamines, by reaction of hydroxy-alkyl amines, or in some instances by reaction of alkyl amines and glycols. In certain of these processes the use of various types of catalysts has also been suggested including those catalysts promoting dehydrogenation, dehydration or deamination reactions. Despite these numerous suggestions a satisfactory and economical process for the production of piperazine is not provided thereby.

In accordance with the present invention piperazine is prepared from an ethylene polyamine or mixture of ethylene polyamines by reaction thereof at elevated temperatures in the presence of boric acid or the anhydride thereof ($B_2O_3$). Among the starting ethylene polyamines there are included ethylene diamine (EDA), diethylene triamine (DETA), triethylene tetramine (TETA), or in general ethylene polyamines of the general formula:

$$(NH_2)_2 \cdot (C_2H_4)_n \cdot (NH)_{n-1}$$

wherein $n$ is an integer from at least 1 and up to 5. Among these, DETA is preferred as a starting material because of its comparative ready availability and its desirable physical properties particularly from the standpoint of its boiling point which is above that of piperazine.

The condensation of the ethylene polyamine with accompanying splitting out of ammonia, may be carried out over a fairly wide temperature range, not necessarily with equal results, from about 200–900° F., within which range there are included liquid phase, mixed phase or vapor phase operation conditions. In the case of polyethylene polyamines boiling above piperazine such as DETA (P. B.=270.1° C. only catalytic quantities of boric acid need be present in the reaction zone, since the piperazine formed in the reaction or its hydrate (depending upon the reaction conditions employed) will distill over from the reaction zone at the temperatures employed, leaving some or all of the boric acid or boric anhydride in the zone to contribute its catalytic properties in promoting further reaction and to combine with further quantities of the free amine present in the zone, presumably by the formation of borate addition salts, acting to inhibit the polymerization of the amine. Since ethylene diamine boils at temperatures very close to that of piperazine and its hydrate, and the borates thereof would be highly unstable at these temperatures, it is desirable to include in the reaction zone anions effective in protecting the amino groups, which anions may be supplied by additional quantities of boric acid or by some foreign volatile acid anion, such as HCl, temporarily forming addition salts of the amine under the reaction conditions.

The preferred operating temperatures are 400–700° F. At the higher temperatures in this range the rate of reaction is accelerated, obtaining higher rates of conversion of the ethylene polyamine, however, with the accompanying production of larger quantities of higher boiling polymers. When the reaction is carried out at temperatures wherein the ethylene polyamine would be present largely or entirely in the vapor phase, it is desirable to include in the reaction zone a granular contact mass and preferably one having adsorbent properties and activity in promoting acid catalyzed reactions. Among the catalytic materials that may be used having such acid properties are included silica-alumina and silica-magnesia, which are known to have fairly high activity in promoting acid catalyzed reactions in the field of hydrocarbon conversion, alumina which in itself is considerably weaker in its acidic properties; and more or less inert solid materials such as charcoal and quartz. These materials serve to afford a surface providing for better contact by the molecules of the starting material and between these and the catalytic material and also serve to maintain a more uniform temperature pattern throughout the reaction zone. In the case of the solid adsorptive agents having catalytic activity, these provide additional acid sites furthering condensation of the amine to produce the desired heterocyclic compounds.

Example I

In an externally heated continuous flow reactor system containing in the reactor proper approximately 25 parts by weight of commercial silica-alumina cracking catalyst (86% $SiO_2$, 12% $Al_2O_3$ by weight and having a surface area of about 190 m.²/g.) there was continuously introduced a mixture of commercial diethylene triamine containing 0.25% by weight of added boric acid. The mixture of DETA and boric acid was added over a 90-minute period and at a rate corresponding to 1.25 volumes of the mixture per hour per volume of catalyst. The vapor effluent from the reactor was condensed and separate cuts collected respectively at the end of 30, 60 and 90 minutes. The average prevailing temperature during the runs was recorded at about 675° F. with the lowest recorded temperature during the run 665° F., the highest recorded temperature being 710° F.

From approximately 21 parts by weight of the amine-boric acid mixture added during the first 30-minute period 14 parts by weight of a liquid product was recovered and 3.25 parts by weight of $NH_3$; the recovered liquid product having a refractive index of $n_D^{25}=1.4836$. From 22.8 parts by weight of the DETA-boric acid mixture added during the second half hour there was collected 22.9 parts by weight of liquid product having a refractive index of $n_D^{25}=1.4850$ and 2.8 parts by weight of ammonia. From 22.8 parts by weight of the DETA-boric acid mixture added during the third half hour there were recovered 20.5 parts by weight of a liquid product having a refractive index of $n_D^{25}=1.4821$ and 21.5 parts by weight of $NH_3$.

Analysis of the product from the last 90-minute run showed the presence of 12.5 volume percent piperazine and 4.5% of an amino-piperazine derivative having a M. W.=99. There were also present 10.7% of unchanged diethylene triamine and 8.1% of ethylene diamine. The DETA can be recycled to the process with or without the ethylene diamine. The piperazine is recoverable in known manner by fractional distillation and can be further purified by recrystallization from a suitable solvent such as ethanol.

While no more than catalytic quantities of boric acid are required in the process to promote the condensation reaction, there is no objection to the inclusion of larger amounts as up to about 25% by weight of the alkylene polyamine or up to this amount of total volatile acid may be employed provided that no less than about 0.2% boric acid is also included as catalyst.

The reaction goes to substantial completion since the ammonia formed is readily volatilized and removed from the field of reaction. The advantages of the process are believed to reside in the substantial absence of water in the field of reaction; the only water present being that small amount formed by conversion of the boric acid to its anhydride and small amounts of water possibly released from the original reagents used.

Obviously, many modifications and variations of the present invention as hereinbefore set forth may be made without departing from the spirit and scope thereof and therefore only such limitations should be imposed as are indicated in the appended claims.

I claim:

1. The method which comprises heating a mixture consisting essentially of diethylene triamine and from about 0.2% to about 25% boric acid to a temperature in the range of 200 to 900° F. in the presence of granular silica-alumina, and recovering piperazine from the reaction products by steps comprising fractional distillation.

2. The method according to claim 1 wherein the mixture is heated to a temperature in the range of 400–700° F.

3. The method according to claim 1 wherein the mixture is heated to about 675° F.

4. The method of producing piperazine which comprises heating a mixture of an ethylene polyamine having the formula $(H_2N)_2(CH_2CH_2)_n(NH)_{n-1}$ wherein $n$ is from 1 to 5 and about 0.2% boric acid to a reaction temperature in the range of 665° F. to 710° F. in the presence of a granular silica-alumina having activity in promoting acid catalyzed reactions at a space rate of about one volume of polyamine per volume of solid per hour and recovering piperazine from the reaction product by steps comprising fractional distillation.

No references cited.